US011913595B1

(12) United States Patent
Tortorella

(10) Patent No.: US 11,913,595 B1
(45) Date of Patent: Feb. 27, 2024

(54) ORGANIZER AND WALL MOUNT FOR ORGANIZER

(71) Applicant: Frank Joseph Tortorella, Park Ridge, IL (US)

(72) Inventor: Frank Joseph Tortorella, Park Ridge, IL (US)

(*) Notice: Subject to any disclaimer, the term of this patent is extended or adjusted under 35 U.S.C. 154(b) by 94 days.

(21) Appl. No.: 17/157,675

(22) Filed: Jan. 25, 2021

Related U.S. Application Data

(63) Continuation of application No. 16/202,033, filed on Nov. 27, 2018, now abandoned, which is a continuation-in-part of application No. 16/051,439, filed on Jul. 31, 2018, now Pat. No. 11,007,634.

(60) Provisional application No. 62/630,177, filed on Feb. 13, 2018, provisional application No. 62/592,222, filed on Nov. 29, 2017.

(51) Int. Cl.
*F16M 11/04* (2006.01)
*B25H 3/02* (2006.01)

(52) U.S. Cl.
CPC ........... *F16M 11/041* (2013.01); *B25H 3/022* (2013.01)

(58) Field of Classification Search
CPC ........ F16M 11/041; B25H 3/022; B25H 3/00; B25H 3/021; B65D 5/26; B65D 2501/24573; B65D 1/30; B65D 21/02; B65D 21/0204; B65D 81/3216; B65D 2577/04; B65D 77/00
USPC ...................................................... 248/316.1
See application file for complete search history.

(56) References Cited

U.S. PATENT DOCUMENTS

| | | | |
|---|---|---|---|
| 2,450,722 A | 10/1948 | Drije | |
| 4,813,542 A * | 3/1989 | Thompson | B65D 21/02 206/508 |
| 4,819,800 A | 4/1989 | Wilson | |
| 6,371,321 B1 * | 4/2002 | Lee | B65D 43/22 220/23.6 |
| 8,596,487 B1 * | 12/2013 | Su | B25H 3/02 220/524 |
| 8,752,802 B1 * | 6/2014 | Fan | H04M 1/04 248/316.1 |
| 9,120,219 B1 * | 9/2015 | Liao | B25H 3/021 |
| D931,611 S * | 9/2021 | Tortorella, Jr. | D3/315 |
| D932,289 S * | 10/2021 | Tortorella, Jr. | D8/373 |
| D959,238 S * | 8/2022 | Nguyen | D8/354 |
| 2002/0113187 A1 * | 8/2002 | Decker | A47K 10/185 248/905 |
| 2004/0195128 A1 * | 10/2004 | Chen | B25H 3/003 206/349 |

(Continued)

*Primary Examiner* — Ernesto A Grano
*Assistant Examiner* — Symren K Sanghera

(57) ABSTRACT

An organizer includes a first base including a first rear portion and first side walls together defining a first interior volume and a first opening to the first interior volume and a first cover dimensioned to engage the first side walls of the first base to occlude the first opening to the first interior volume with the first cover in a closed position. The organizer also includes removable containers dimensioned to occupy the first interior volume. Each of the removable containers includes a base including a rear portion and side walls together defining an interior volume and an opening to the interior volume. Each of the removable containers includes a cover dimensioned to engage the side walls of the base to occlude the opening to the interior volume of the removable container with the cover in a closed position.

11 Claims, 13 Drawing Sheets

(56) References Cited

U.S. PATENT DOCUMENTS

| | | | | |
|---|---|---|---|---|
| 2009/0277936 A1* | 11/2009 | Rogers | .................... | A45F 5/02 |
| | | | | 24/647 |
| 2013/0299533 A1* | 11/2013 | Gronewoller | ........ | H04B 1/3888 |
| | | | | 224/191 |
| 2014/0061415 A1* | 3/2014 | Hermey | ................ | F16M 13/02 |
| | | | | 248/316.1 |
| 2015/0201723 A1* | 7/2015 | Rayner | ................ | F16M 13/04 |
| | | | | 224/191 |
| 2018/0161975 A1* | 6/2018 | Brunner | .................. | B25H 1/04 |
| 2021/0054963 A1* | 2/2021 | Nguyen | ............... | F16M 11/041 |
| 2021/0059390 A1* | 3/2021 | Knoblauch | ............. | B25H 3/00 |

\* cited by examiner

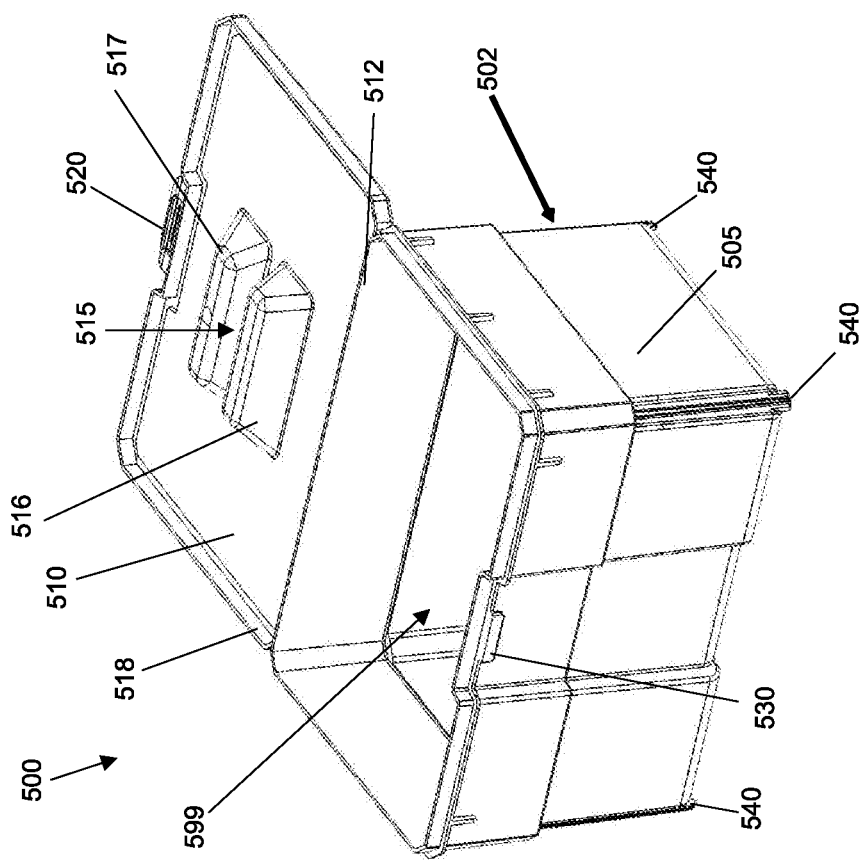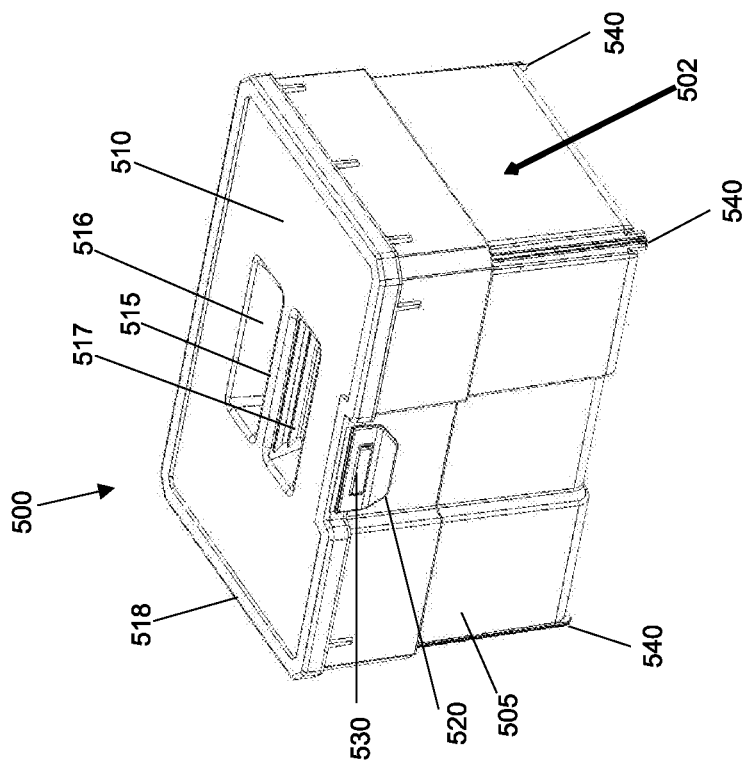

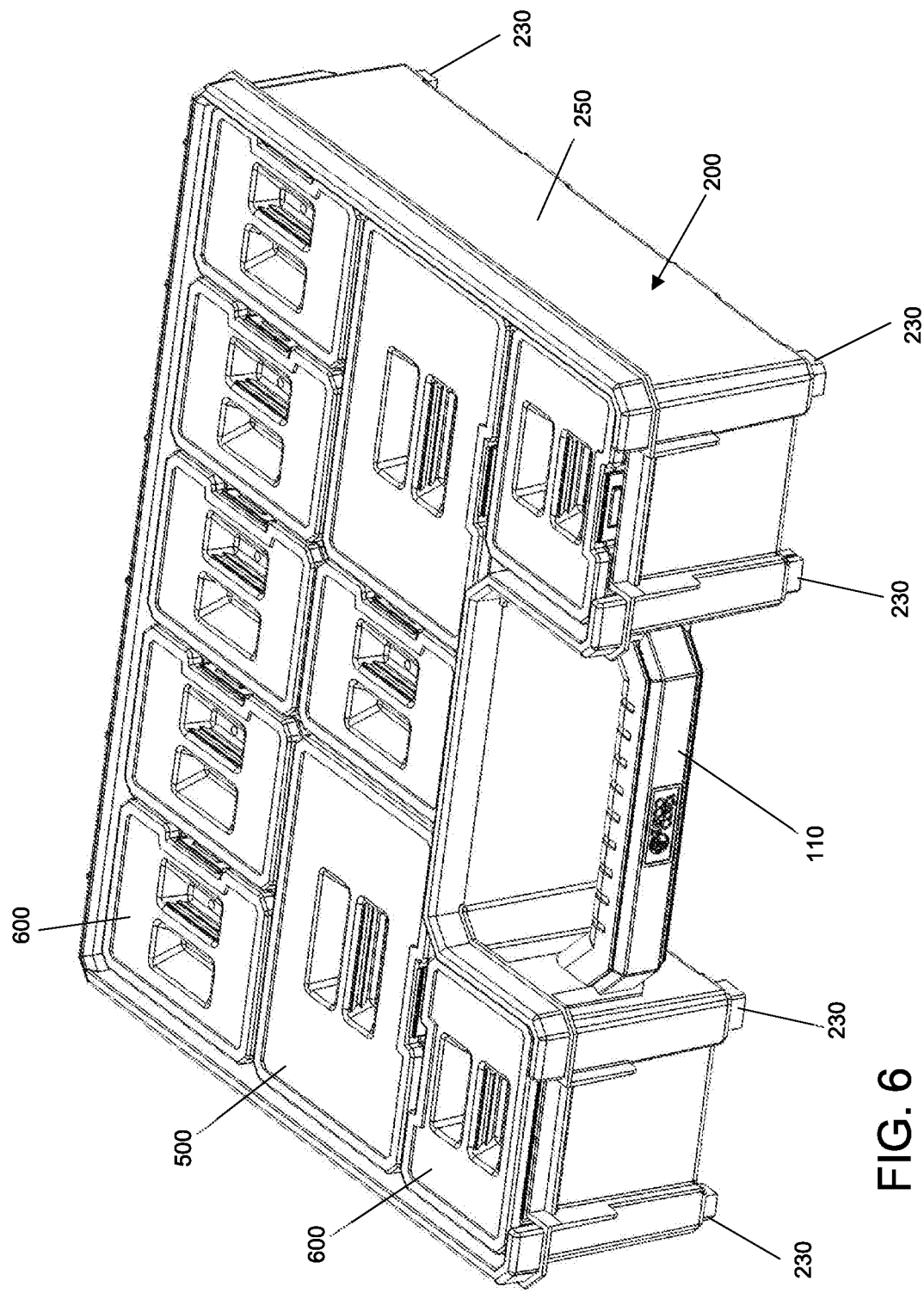

ORGANIZER AND WALL MOUNT FOR ORGANIZER

This application claims priority to U.S. Provisional Patent Application Ser. No. 62/592,222 filed on Nov. 29, 2017, claims priority to U.S. Provisional Patent Application Ser. No. 62/630,177 filed on Feb. 13, 2018, and claims priority to U.S. Non-Provisional patent application Ser. No. 16/051,439, titled "Organizer and Wall Mount for Organizer," filed on Jul. 31, 2018, of which this application is a Continuation-In-Part, and claims priority to U.S. Non-Provisional patent application Ser. No. 16/202,033, titled "Organizer and Wall Mount for Organizer." filed on Nov. 27, 2018, of which this application is a Continuation application, the contents of which are each incorporated herein by reference in their entirety.

BACKGROUND

Toolboxes house tools, as well as smaller parts and accessories (e.g., nails, screws, fasteners, washers, electrical connectors, electrical tape, drill bits, toggle bolts, anchors, etc.) in one or more drawers or trays, which may include partitions to define subsections in which the tools, parts and accessories may be disposed.

BRIEF DESCRIPTION OF THE DRAWINGS

FIG. 5A is an example perspective view of an example first removable container with an example cover disposed in an example closed position.

FIG. 5B is an example perspective view of the example first removable container of FIG. 5A with the example cover disposed in an example open position.

FIG. 6 is an example perspective view of the example organizer of FIGS. 1-4 with the example cover removed for clarity to show an interior volume of the example organizer and, disposed therein, an example combination of example removable containers, including the example first removable container of FIGS. 5A-5B.

FIG. 8B is an enlarged perspective view of the example wall mount of FIG. 8A showing an example first wall mount connector to which the example second wall mount connector of the example bottom of the example base of the example organizer of FIGS. 1-4 and FIGS. 6-7A is dimensioned to removably and matingly engage.

Figure 1:
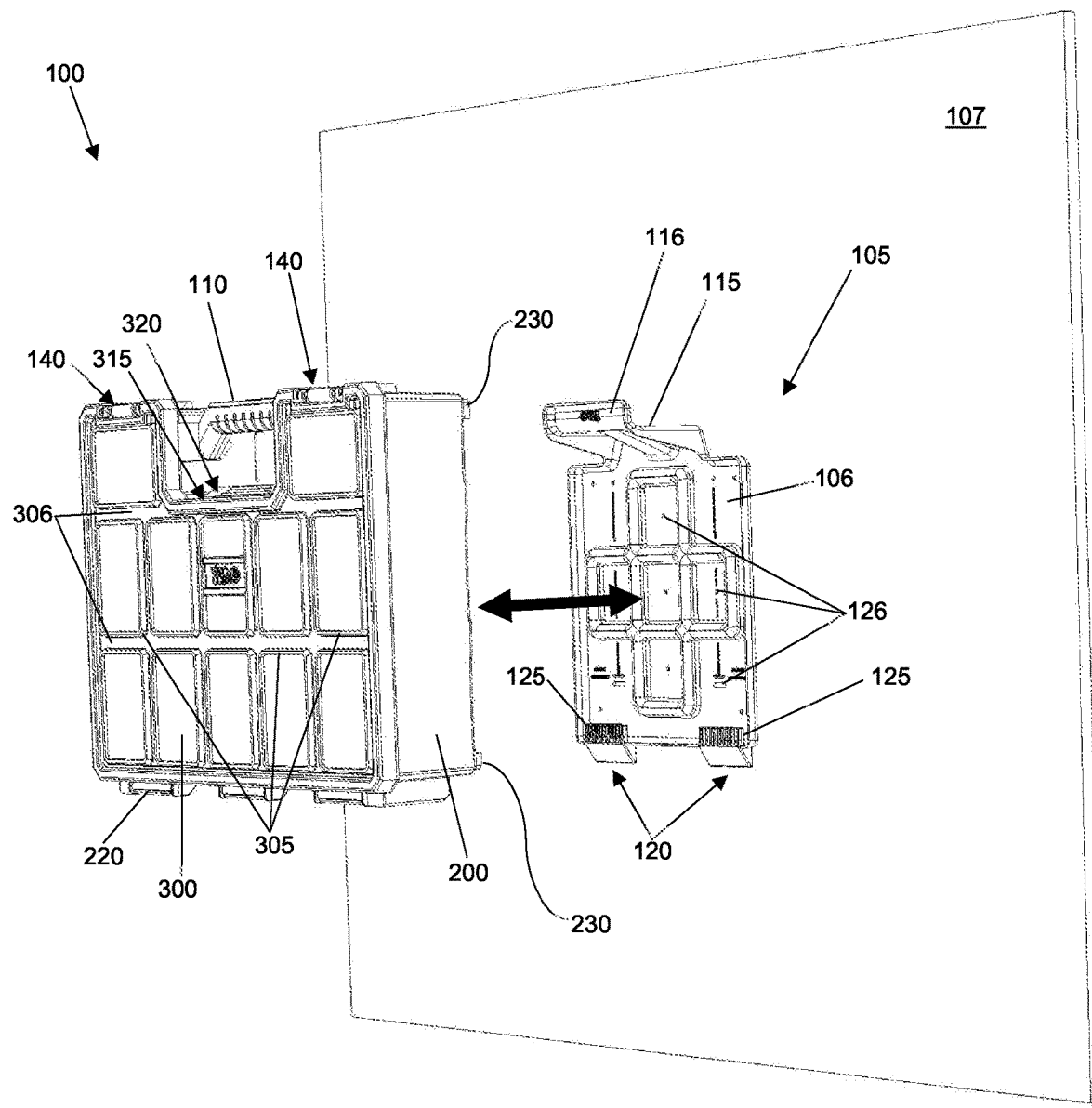
FIG. 1 is a perspective view of an example organizer, in accord with some aspects of the disclosure, disposed adjacent an example wall mount, in accord with some aspects of the disclosure, to which the example organizer is able to be selectively mounted or selectively demounted.

The FIGURES are not necessarily to scale. Wherever possible, the same reference numbers will be used throughout the drawing(s) and accompanying written description to refer to the same or like parts. As used herein, stating that any part is in any way positioned on (e.g., positioned on, located on, disposed on, etc.) another part, indicates that the referenced part is either in contact with the other part, or that the referenced part is above the other part with one or more intermediate part(s) located therebetween. Stating that any part is in contact with another part means that there is no intermediate part between the two parts.

DETAILED DESCRIPTION

In some aspects, this disclosure relates to an organizer system, and more particularly to an organizer (e.g., for tools, components, small parts, accessories, hobby parts, odds and ends, etc.), and still more particularly to an organizer having a vertical form factor (e.g., a height greater than a depth, a height significantly greater than a depth, etc.).

In some examples, this disclosure relates to a wall mounted organizer system, and more particularly to a wall mounted organizer system including a wall mount configured to removably receive and store an organizer, and still more particularly to a wall mounted organizer system including a wall mount configured to removably receive and store an organizer having a vertical form factor.

Figure 2:
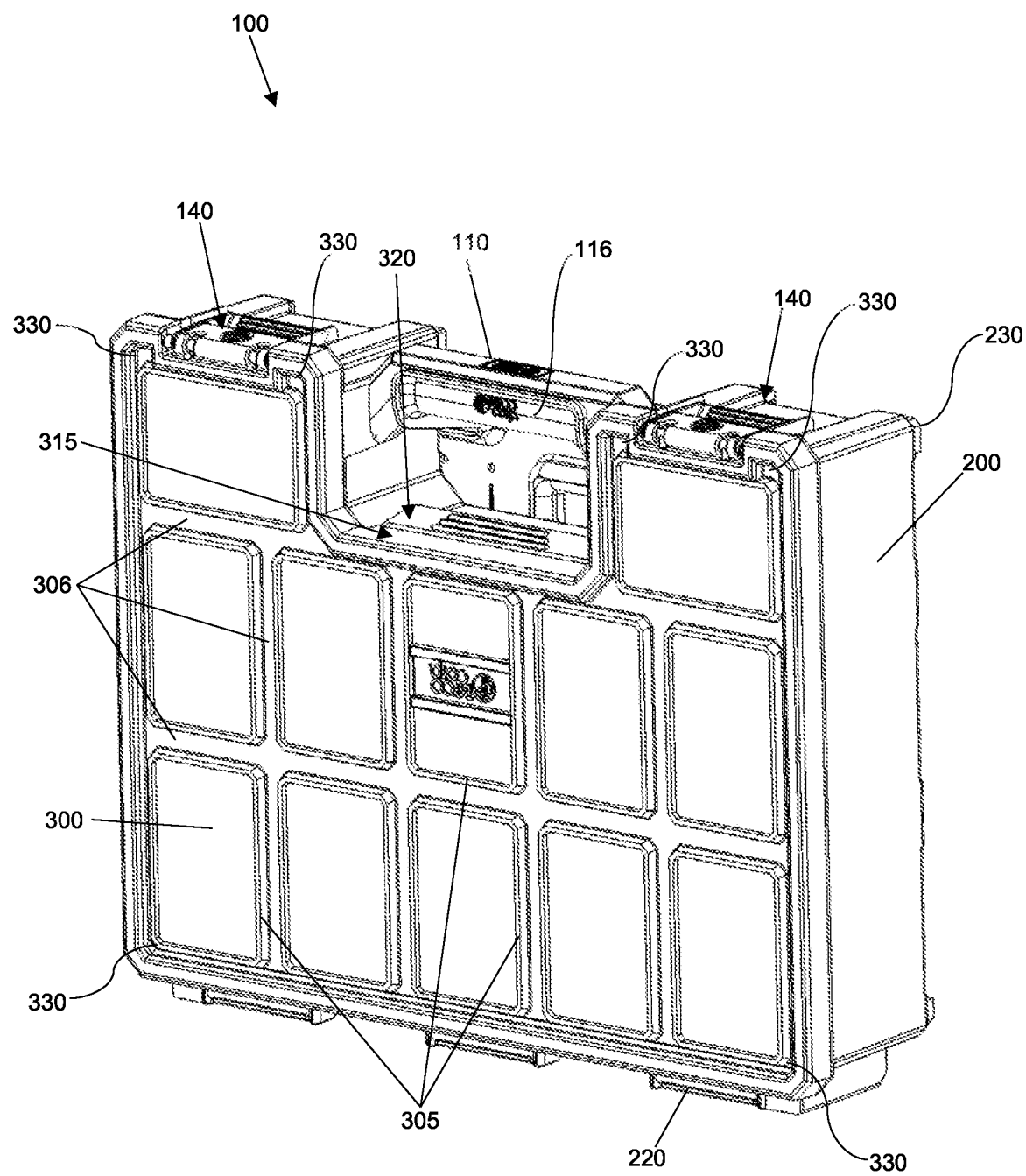
FIG. 2 is a perspective view of the example organizer of FIG. 1.
Figure 3:
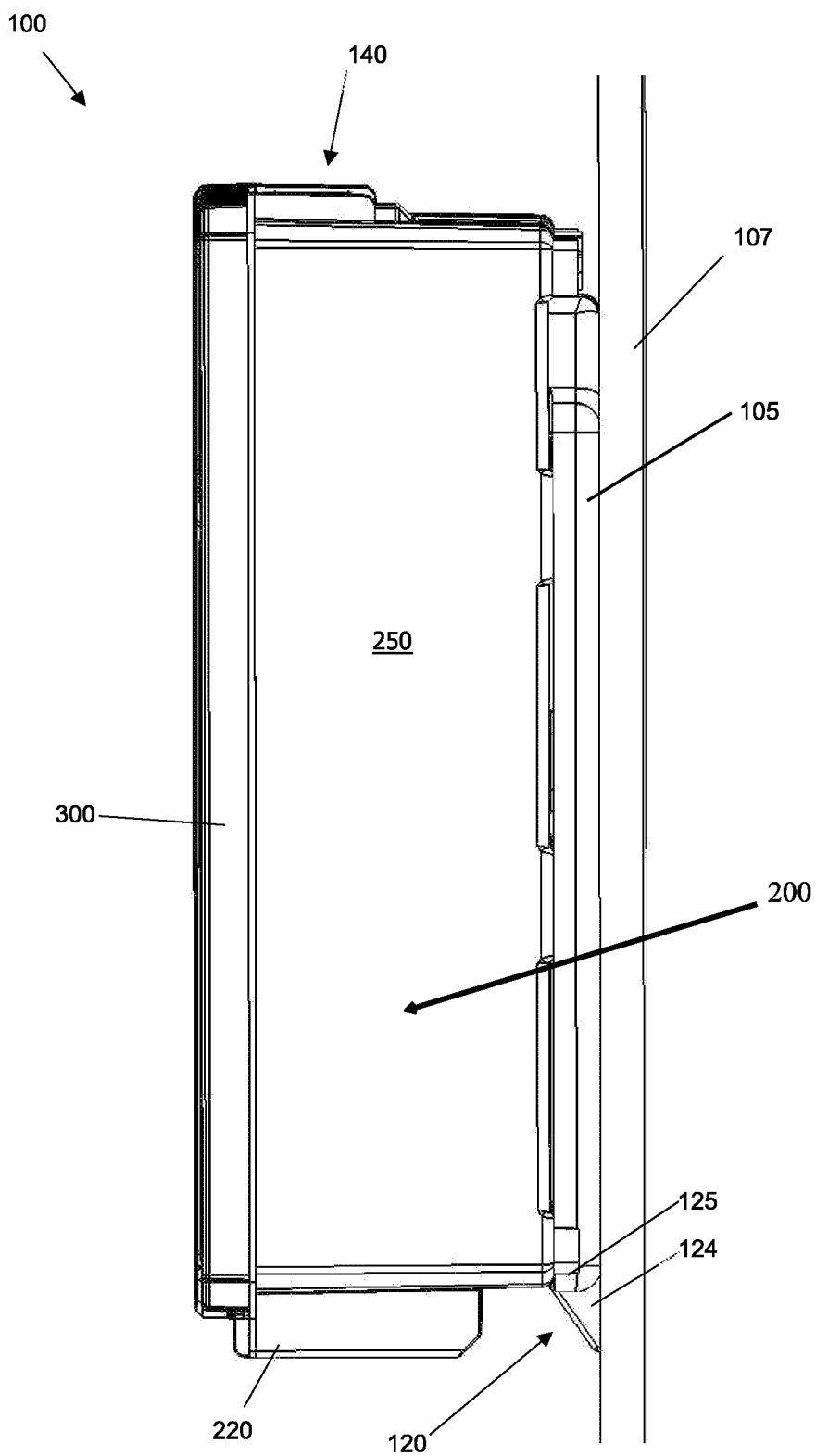
FIG. 3 is an example side view of the example organizer of FIG. 1 attached to the example wall mount of FIG. 1.

FIGS. 1-3 are example perspective views of an example organizer 100 disposed adjacent an example wall mount 105 mounted on an example wall 107. The example organizer 100 is selectively attached to or selectively detached from the example wall mount 105 by a user. In some examples, the example wall 107 includes a wall of a home, business, or building. In some examples, the example wall 107 includes an upright or an inclined surface (e.g., vertical or non-vertical, a positively inclined surface, a negatively inclined surface, etc.) of any type such as, but not limited to, an interior wall of a work vehicle (e.g., a utility van, etc.), a partition or a work station.

The example organizer 100 of FIG. 1, and FIGS. 2-3, is shown to include an example base 200 and an example cover 300 matingly engaged to the example base 200. In the example of FIGS. 1-3, the example base 200 is matingly engaged to the example cover 300 via one or more (e.g., two, three, etc.) example hinges 220 along a side (e.g., a bottom side) of the example organizer 100, as is shown by way of example in FIGS. 1-3. In some examples, the example hinges 220 are external hinges, such as is shown in the example organizer 100 of FIGS. 1-3. In some examples, the example hinges 220 are internal hinges. In some examples, the example cover 300 is not connected to the example base 200 and is removable from the example base 200. In such example, the example cover 300 is selectively connected to the example base 200 via a plurality of latches or locking members.

The example organizer 100 of FIG. 1-3 is also shown to include an example handle 110 and an example center connector 315 disposed at a central portion of the example organizer 100. In some examples, the example handle 110 and/or the example central connector 315 are attached to, or are integral with (e.g., formed as part of, permanently affixed to, etc.), the example base 200. In some examples, the example handle 110 and/or the example central connector 315 are attached to, or are integral with, the example cover 300. In some examples, the organizer may include example lateral connectors (not shown) on lateral sides of the example organizer 100 and/or laterally adjacent the example center connector 315 to enhance lock-up of the example cover 300 to the example base 200.

In some examples, the example central connector 315 comprises a mechanical closure such as, but not limited to, a latch, a mechanical fastener, a linkage, a magnet (e.g., a rare-earth magnet, a neodymium magnet, etc.), a snap connector, a clasp, a quick release fastener or a slide lock. In the example of FIGS. 1-3, the example central connector 315 includes an example snap connector. Lateral connectors, if provided, may also include a mechanical closure such as, but not limited to, a latch, a mechanical fastener, a linkage, a magnet, a snap connector, a clasp, a quick release fastener or a slide lock.

FIGS. 1-2 show an example wherein the central connector 315 includes an example hinge connecting the example central connector 315 to the example cover 300 and includes an example tab 320 to facilitate a user's outward biasing of the example central connector 315 relative to the example base 200 and the example cover 300 to disengage the example mechanical closure (e.g., a snap connector, a ledge, a strike, a protrusion or boss, a recess, etc.) of the example central connector 315 from a corresponding mechanical closure (e.g., another of a snap connector, a ledge, a strike, a protrusion or boss, a recess, etc.), which may be continuous or discontinuous, on the example base 200. In some examples, the example hinge is a living hinge. In some examples, the example central connector 315 is a separate part from the example cover 300 and the example central connector includes a first hinge member (e.g., a shaft, etc.) that is attached to corresponding second hinge member (e.g., a knuckle, a loop, joint, a node, etc.) of the example cover 300, with a spring or resilient element biasing the example central connector 315 inwardly to facilitate the automatic engaging of the example mechanical closure of the example central connector 315 with the corresponding mechanical closure on the example base 200.

Figure 4:
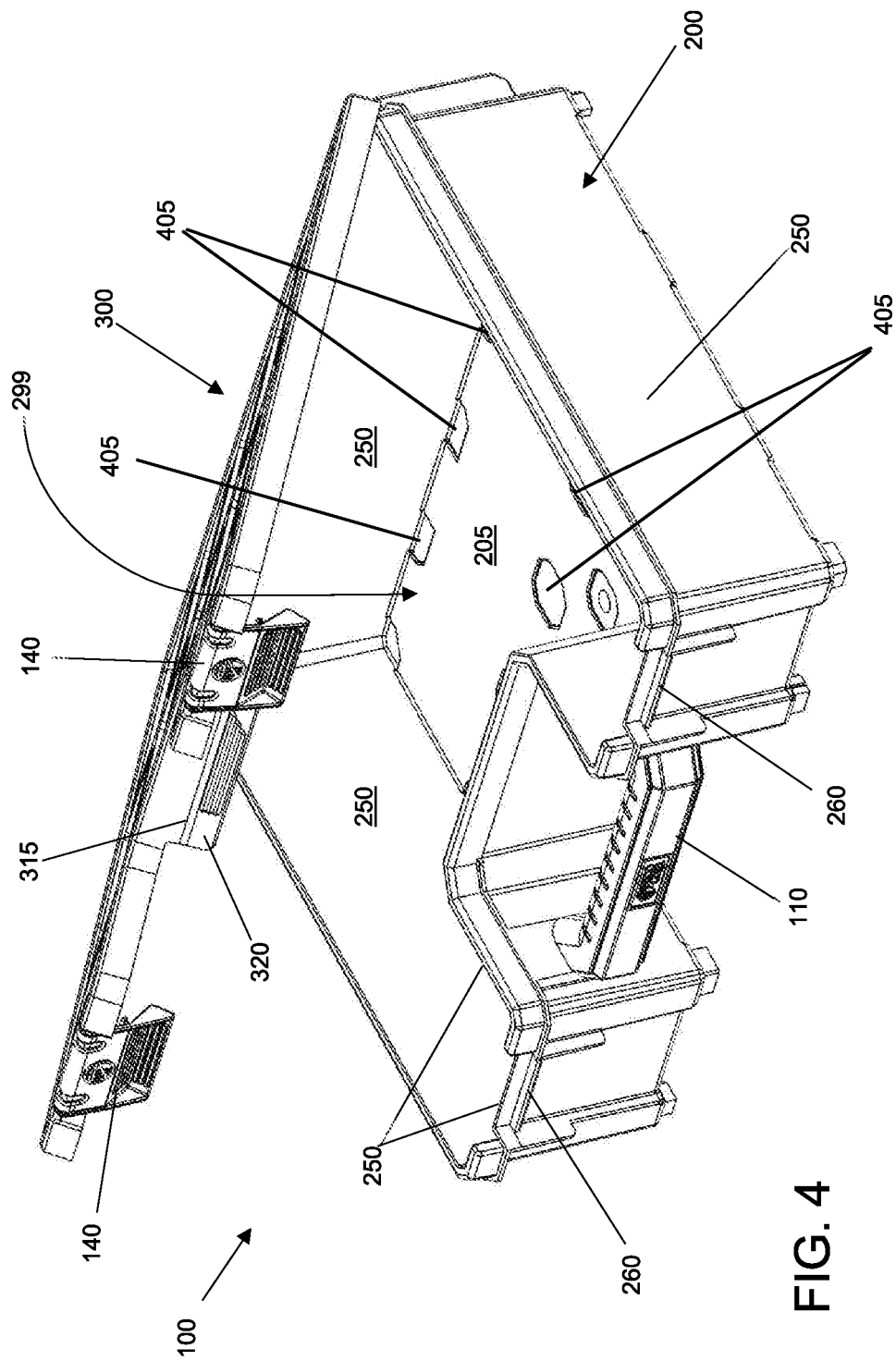
FIG. 4 is a perspective view of the example organizer of FIG. 1 with an example cover disposed in an example open position.

In some examples, the example central connector 315 extends at least substantially perpendicularly (e.g., 89°, 90°, 91° etc.) to the example base 301 (e.g., the plane generally defining the example cover 300) of the example cover 300, such as is shown in FIGS. 1-2 and FIG. 4. In some examples, the example central connector 315 is canted outwardly relative to the example base 301, such as at an outwardly directed angle from the perpendicular of between about 0°-5° (e.g., 91°, 92°, 93°, 94°, 95° etc. relative to the example base 301) or more. In some examples, the example central connector 315 is canted inwardly relative to the example base 301, such as at an inwardly directed angle from the perpendicular of between about 0°-5° (e.g., 89°, 88°, 87°, 86°, 85°, etc. relative to the example base 301) or more. In some examples, the example tab 320 is canted outwardly relative to the example central connector 315 (e.g., away from example base 200 and the example cover 300 with the example organizer 100 in a closed position), such as at an angle between about 0°-30°, to facilitate digital manipulation of the example tab 320 by a user when opening the example organizer 100. In some examples, the example tab 320 rather than the example central connector 315 includes an example mechanical closure (e.g., a snap connector). In closure, a user is able to simply rotate the example cover 300 toward and into engagement with the example base 200 and the example central connector 315, or the example tab 320, automatically engages and locks onto the example base 200 to securely retain the example cover 300 in engagement with the example base 200. For instance, the example first mechanical closure(s) (not shown) of the example central connector 315 engage(s) the example second mechanical closure(s) (not shown) of the example base 200. In this state, with the example central connector 315, or the example tab 320, locked onto the example base 200 via the mechanical closures, the example organizer can be oriented in another position (e.g., a vertical position as shown in FIG. 2, etc.) and the example cover 300 will remained locked to the example base 200.

The example in the following paragraphs relates to an example organizer similar to that of the example of FIGS. 1-3, but some components are positioned differently than in the example organizer 100 of FIGS. 1-3. For clarity, in the example that follows, the reference numerals of the example of FIGS. 1-3 (e.g., base 200) are used with a prime indicator (e.g., base 200') to connote that the structures of the example that follows are essentially the same as that of the example of FIGS. 1-3, but are disposed on a different part of an example organizer 100' than that of the example organizer 100 shown in FIGS. 1-3. In the example that follows, an example central connector 315' (not shown) is connected to an example base 200' (not shown) and an example cover 300' (not shown) includes the corresponding mechanical closure (e.g., a snap connector, a ledge, a strike, a protrusion or boss, a recess, etc.), continuous or discontinuous, with which the example central connector 315' of the example base 200' engages.

In some examples, the example central connector 315' is connected to the example base 200' via a hinge such as, but not limited to, a living hinge. In some examples, the example central connector 315' is a separate part from the example base 200' and the example central connector includes a first hinge member (e.g., a shaft, etc.) that is attached to corresponding second hinge member (e.g., a knuckle, a loop, joint, anode, etc.) of the example base 200' with a spring or resilient element biasing the example central connector 315' inwardly to facilitate the automatic engaging of the example mechanical closure of the example central connector 315' with the corresponding mechanical closure on the example cover 300'. In some examples, the example central connector 315' includes an example tab 320' canted outwardly relative to the example central connector 315' by an angle between about 0°-30°. The example tab 320' facilitates a user's outward biasing of the example central connector 315' relative to the example base 200' and the example cover 300' to disengage the example mechanical closure (e.g., a snap connector, a ledge, a strike, a protrusion or boss, a recess, etc.) of the example central connector 315' from a corresponding mechanical closure (e.g., another of a snap connector, a ledge, a strike, a protrusion or boss, a recess, etc.) on the example cover 300'.

In some examples, the example central connector 315' extends parallel to or substantially parallel to the example outer side walls 250' of the example base 200'. In some examples, the example central connector 315' extends upwardly to a point above an upper edge of the example outer side walls 250' of the example base 200'. In some examples, the example central connector 315' is attached to, or integrated with, the example base 200' in an outwardly canted orientation relative to the example base 200' and the example cover 300' (e.g., canted at an angle between about 0°-15°, etc.) to facilitate digital manipulation by a user. In some examples, the example central connector 315' is canted outwardly slightly relative to the outer side walls 250', such as at an outwardly directed angle of between about 0°-5° or more relative to the example outer side walls 250'. In some examples, the example central connector 315' is connected to a respective one of the example outer side walls 250' (e.g., an outer side wall positioned adjacent the example handle 110') via a living hinge at a proximal end of the example central connector 315', the proximal end being displaced outwardly from the respective one of the example outer side walls 250' via an offset. In this example, the example central connector 315' is canted inwardly relative to the respective one of the example outer side walls 250' (e.g., at an inwardly directed angle of between about 0°-5°), such that a spacing between at least a portion of a distal end of the example central connector 315' and the respective one of the example outer side walls 250' is less than a spacing between the example proximal end of the example central connector 315' and the respective one of the example outer side wall 250'.

In some examples, as shown by way of example in FIGS. 1-3, the example cover 300 includes example bosses 305 (e.g., protruding features). In some examples, the example cover 300 does not include the example bosses 305. In the example of FIGS. 1-3, the example bosses 305 are raised portions of the cover, projecting above a base height 306 of the example cover 300. In the illustrate example, the example features of example bosses 305 form a pattern (e.g., a lattice, etc.). In some examples, the example bosses 305 define channels (not shown) on a bottom portion thereof facing an interior volume of the example organizer 100 when the example cover 300 is in a closed position. In some examples, the example bosses 305 may have a generally rectangular, squared, or U-shaped profile. In some examples, the example bosses 305 are reversed, extending below a base height of the example cover 300, to thereby defining projections on an underside of the cover. In some examples, the example bosses 305, or the channels defined by the example bosses 305, engage corresponding features (e.g., projections, male connectors, recesses, female connectors, etc.) of one or more removable containers disposed within an interior volume of the example organizer 100 when the example cover 300 is in a closed position. In some examples, channels defined about the periphery of example cover 300 by the example bosses 305 matingly engage upper portions of the example base 200 (e.g., upper portions of example walls 250) when the example cover 300 is in a closed position.

In the examples of FIGS. 1-2, the example bosses 305 are shown to define example lands 330 at a plurality of locations about the example cover 300. In some examples, the example lands 330 are defined independently of any example bosses 305. In some examples, the example cover 300 includes, in place of the lands, connectors (e.g., snap-fit connectors). In application, the example lands 330, or connectors, are dimensioned and configured to receive, and optionally retain (e.g., via a connector, friction coupling, magnet, etc.), example feet 230 of another organizer (e.g., 100') to permit the stacking of a plurality of organizers on top of one another. In some examples, the example bosses 305 serve to limit lateral movement of example feet 230 of an example organizer (e.g., 100') atop another example organizer (e.g., 100). In some examples, the example bosses 305 and/or connectors serve to limit and/or prevent lateral and/or vertical movement of example feet 230 of a second example organizer (e.g., 100') relative to a cover 300 of a first example organizer (e.g., 100) on which the second example organizer (e.g., 100') is stacked.

Turning to the example wall mount 105 of FIGS. 1-3, the example wall mount 105 includes an example base 106 that is attached to the example wall 107 or other inclined surface (e.g., a panel, a hutch, a pegboard, a partition, etc.). An upper portion of the example wall mount 105 includes an example receiver 115 extending outwardly from the example base 106 (e.g., away from the example wall 107 or other surface to which the example wall mount 105 is attached) to receive a handle (e.g., example handle 110 of the example organizer 100 of FIGS. 1-3, etc.) thereupon. The example receiver 115 may extend perpendicularly from the example base 106, substantially perpendicularly from the example base 106 (e.g., 88°, 89°, etc.), or at an upward cant (e.g., 60°, 75°, 80°, etc.) or a downward cant (e.g., 60°, 75°, 80°, etc.) relative to the example base 106.

In some examples, an example distal end of the example receiver 115 includes an example retainer 116. In some examples, such as is shown in FIGS. 1-2, the example retainer 116 includes one or more upwardly curving sections. In some examples, the example retainer 116 includes one or more upwardly extending sections or members (e.g., posts, pins, plates, etc.). The example retainer 116 is to inhibit or prevent forward movement of the handle (e.g., 110) of the organizer (e.g., 100) away from the example base 106 of the example wall mount 105 and off of the example receiver 115. In some examples, the example retainer 116 includes one or more upwardly extending sections or members (e.g., male connectors) corresponding in dimension and placement to matingly engage recessed sections (e.g., female connectors) or other features in a handle of an organizer or in a common handle configuration used for a family of organizers. In some examples, the retainer 116 includes one or more recessed areas (e.g., grooves, slots, cutouts, recesses, etc.) corresponding in dimension and placement to matingly engage one or more portions in a handle of an organizer or in a common handle configuration used for a family of organizers. For instance, in some examples, the retainer 116 includes a semi-cylindrical recess having a first diameter, dimensioned to receive a handle having a second diameter that is less than the first diameter. In some examples, the retainer 116 may include a combination of one or more upwardly extending sections or members and one or more recessed areas. In the example of FIGS. 1-3, the example retainer 116 upwardly curves from the example base 117. In some examples, this upward curve corresponds generally to a curve of a handle of an organizer, or family of organizers, that are mated with, or intended to be used with, the example wall mount 105.

FIGS. 1-2 show that the example base 106 of the example wall mount 105 includes one or more example openings 126, such as holes (e.g., circular openings, etc.) to facilitate use of conventional mechanical fasteners (e.g., screws, nuts, nails, rivets, etc.) to secure the example base 106 of the example wall mount 105 to the example wall 107 or other inclined surface. In some examples, the one or more example openings 126 include slots (e.g., oblong openings, etc.) to further facilitate additional degrees of freedom in positioning of the mechanical fasteners relative to structures (e.g., studs, supports, etc.) of the example wall 107 or other inclined surface.

In some examples, the example base 106 includes one or more example first connectors 125 including one or more male features (e.g., an example ridge or protrusion, a snap connector, etc.) and/or one or more female features (e.g., an example recess, slot, groove, etc.). For instance, it the example of FIG. 1, the vertical aspects of the example first connectors 125 may engage correspondingly oriented and dimensioned connectors (e.g., vertically oriented spaced-apart grooves, etc.) on a rear side of the example base 200. In some examples, the example first connector 125 is integrated with or attached to an example support 120. In FIGS. 1-3, two spaced-apart example supports 120 are shown, each with an example first connector 125. In some examples, the example wall mount 105 includes one support 120 extending along an entire width of the example wall mount 105 or, alternatively, extend along only a portion of the width of the example wall mount 105 (e.g., a centrally-disposed support having one-half, one-third, one-quarter, or other fractional portion of the width of the example wall mount 105). In some examples, three supports 120 are provided, with two laterally disposed supports (e.g., as shown in FIGS. 1-2) and one centrally disposed support.

In some examples, the example supports 120 engage a bottom portion of the example organizer 100 borne by the example wall mount 105. In some examples, the example first connectors 125 matingly engage example second connectors 810 (see FIGS. 8A-8B) on the bottom portion of the example organizer 100 to limit or prevent motion of the bottom portion of the example organizer along one or more axes (translational and/or rotational). In some examples, the example first connectors 125 and the example second connectors 810 may include male-female connectors (e.g., spike and cone, pin and socket, boss and indentation, etc.), snap-fit connectors, frictional engagement surfaces, magnetic connectors or biasing elements (e.g., spring assisted pins, etc.). In the example of FIG. 1, the example first connectors 125 include male connectors projecting upwardly from the example supports 120 and the example second connectors 810 (not shown in FIG. 1) include female connectors comprising recesses formed within the example base 200 to receive the example first connectors 125. In some examples of the present concepts, the example first connectors 125 and the example second connectors 810 are omitted.

In some examples, the example supports 120 and/or the example first connectors 125 are omitted. For instance, the example organizer 100 engages the example wall mount 105 via only the example handle 110. In some examples, the example supports 120 and/or the example first connectors 125 are positioned on one or more different portions of the example wall mount 105 so as to engage correspondingly positioned features (e.g., second connectors 810) formed on the example base 200 of the example organizer 100. For instance, the example supports 120 and/or the example first connectors 125 can be positioned on lateral portions of the example wall mount 105 to engage example second connectors positioned on lateral portions of the example base 200. As another example, the example supports 120 and/or the example first connectors 125 can be positioned on the example base 106 of the example wall mount 105 to engage example second connectors positioned on an example rear portion 205 (see, e.g., FIG. 4) of the example base 200.

FIG. 2 is a perspective view of the example organizer 100 attached to the example wall mount 105. The example handle 110 of the example organizer 100 is nestled on the example receiver 115 (not shown) and is displaced adjacent, or in contact with, the example retainer 116. In some examples, such as shown in the example organizer 100 of FIGS. 1-3, the example hinges 220 include an example first hinge member 322 on the example cover 300 and an example second hinge member 222 on the example base 200 that are connectable to one another to form the example hinge 220. For instance, the example second hinge member 222 may include a fixed shaft and the example first hinge member 322 may include one or more rotational snap-fit connectors to snap about the example second hinge member 222 to allow the example first hinge member(s) 322 to rotate relative to the example second hinge member 222. In the example of FIG. 2, the example organizer 100 includes three spaced apart example hinges 220. In other examples, a lesser number (e.g., one or two) or a greater number (e.g., four, etc.) of hinges 220 are provided. For instance, a single hinge 220 extending along a majority of a width of the example cover 300 and the example base 200 may be used to rotatably connect the example cover 300 and the example base 200.

FIG. 3 is an example side view of the example organizer 100 attached to the example wall mount 105. FIG. 3 shows the connection between the example first connectors 125 of the example supports 120 and the example second connectors 810 (see FIGS. 7A-7B) of the example organizer 100. The example supports 120 are also shown to include an example angled support 124.

FIG. 4 is an example perspective view of the example base 200 and the example cover 300 of the example organizer 100, with the example cover 300 in an example partially opened position. The example base 200 includes example outer side walls 250 and an example rear portion 205 that collectively define an example interior volume 299 and an opening to the example interior volume 299. While the example outer side walls 250 and the example rear portion 205 collectively define the example interior volume 299 in the example of FIG. 4, the example outer side walls 250 and the example rear portion 205 may define other shapes, such as a rectangular shape or a square shape, with correspondingly-shaped interior volumes. For instance, the example organizer 100 could include four side walls 250 of substantially equal length and a handle that extends outwardly from one of the four side walls 250, defining an interior volume 299 represented by a rectangular solid.

FIG. 4 shows an example perspective view of the example cover 300. In some examples, the example cover 300 is dimensioned to engage the example side walls 250 of example base 200 to occlude the example opening to an example interior volume 299 of the example organizer 100 with the example cover 300 in a closed position. In some examples, the example cover 300 includes, at a first end, two example hinge bars or support structures (not shown) to receive closure members (e.g., latch, clasp, lock, etc.), such as the example lateral connectors 140 positioned laterally to the example central connector 315. In some examples, the example central connector 315 is connected to the example cover 300 via a hinge such as, but not limited to, a living hinge or living connection. In some examples, the example central connector 315 is, in a default state, biased inwardly (e.g., in a direction toward the example base 200) to promote a positive engagement between the example central connector 315 and the example base 200.

In some examples, the example central connector 315 and the example first connector of the example central connector 315 is connected to, or formed on, the example base 200 rather than the example cover 300, with the corresponding second connector being connected to, or formed on, the example cover 300.

In some examples, the example central connector 315 includes one or more first connectors (e.g., projections, etc.) dimensioned and positioned to snap into engagement with one or more corresponding second connector formed on the example base 200 (e.g., a ledge defined by, or attached to, a first end of the example outer side wall 250 of the example base 200, etc.). In some examples, the example first connector of the example central connector 315 includes inverted triangular catches that slide into engagement with the example outer side wall 250 and lever the example central connector 315 outwardly as the example cover 300 is closed onto the example base 200. In the closed position of the example cover 300, the first connectors of the example central connector 315 engage the second connectors of the example base 200 to automatically and positively latch the example cover 300 to the example base 200.

The example base 200 is further shown to define, in the example rear portion 205, an example first arrangement of example recesses 405. The example recesses 405 are dimensioned and configured to receive example feet 540 of corresponding ones of a plurality of example removable first containers 500 (FIGS. 5A-5B) and/or other removable containers. Thus, the example removable containers (e.g., example removable second containers) may advantageously be of a different size (e.g., larger or smaller in one or more dimensions) and/or different configuration than the example first removable container 500. For example, the example second removable container may have the same height as the example first removable container 500, but possess a different lateral dimension (e.g., greater width or greater depth).

The example removable first containers 500 (FIGS. 5A-5B) and/or any other removable container(s) are dimensioned, collectively, to at least substantially fill the example interior volume 299 in one or more different arrangements and/or combinations (e.g., a plurality of only the example removable first containers 500, a plurality of another example removable containers, a selected combination of the example removable first containers 500 and one or more other example removable containers, etc.). The example first removable container 500 represent an example of a removable container that may be dimensioned, singly or in combination with one or more other configurations of removable containers, to at least substantially fill an interior volume of a container or a sub-portion thereof. In some examples, only a sub-portion of an interior volume of a container includes one or more of the removable containers. For instance, the present concepts include example organizers in which a first sub-volume of the organizer is dedicated to a structure and purpose not relating to the removable containers and a second sub-volume of the organizer is dedicated to receipt of and retention of one or more of the example removable containers.

The example base 200 may include any number of arrangements of, and/or sizes of, example recesses 405 to accommodate any possible arrangement of the example removable first containers 500 and/or other example removable containers and any possible arrangement of example legs 540. In some examples, one or more of the example recesses 405 include an example connector (e.g., a female connector, a male connector, etc.) to matingly engage a corresponding portion of the example legs 540 and/or a corresponding connector of the example removable first containers 500 and/or another removable container dimensioned to fit in the example interior volume 299.

FIGS. 5A-5B are, respectively, an example perspective view of an example first removable container 500 with an example cover 510 disposed in an example closed position and an example perspective view of the example first removable container 500 with the example cover 510 disposed in an example open position. In the example of FIGS. 5A-5B, the example cover 510 is connected to the example base 502 via a hinge, such as a living hinge. In some examples, the example cover 510 is removably connected to the example base 502 via one or more example latches or locks that selectively retain the example cover 510 in a closed and locked position relative to the example base 502. In some examples, the example cover 510 is removably connected to the example base 502 via one or more snap-fit connectors. In some examples, the example cover 510 is removably connected to the example base 502 via one or more magnetic closures (e.g., neodymium magnet(s), etc.).

The example first removable container 500 includes an example base 502 including a rear portion (not shown) and example side walls 505 extending from the rear portion to collectively define an example interior volume 599 (FIG. 5B) and an example opening to the example interior volume 599. The example first removable container 500 also include an example cover 510 dimensioned to engage the example side walls 505 of the example base 502 to occlude the example opening to the interior volume 599 with the example cover 510 in a closed position.

As noted above, the example first removable container 500 is shown to include a plurality of example legs 540, four example legs 540 in the example of FIGS. 5A-5B, downwardly depending from the example base 502. In other examples, the example first removable container 500 includes a lesser number of legs or a greater number of legs. For instance, the example first removable container 500 may have a substantially flat second rear portion (e.g., a flat bottom) or one leg (e.g., a pedestal).

In the example first removable container 500, the example base 502 includes, on an exterior portion thereof, a plurality of features including one or more male members and/or one or more female members. In one example, the features include the aforementioned example legs 540 (e.g., male members) extending downwardly from the example second rear portion. These features of the example first removable container 500 are configured to engage or matingly interact with a plurality of features of the example base 200 including another one of the male member or the female member arranged, to complement the feature(s) of the example base 502, and dimensioned to engage or matingly interact with the features of the example base 502. For instance, in some examples, the engagement of the example first features of the example first removable container 500 (e.g., the example legs 540) and the example second features of the example base 200 (e.g., the recesses 405) inhibits lateral movement of the first removable container 500 within the example interior volume 299.

In some examples, the example cover 510 of the example first removable container 500 includes an example locking member 520 constructed to engage a complementary example locking member 530 attached to or formed on the example side walls 505 of the example base 502. The example locking member 520 and the example locking member 530 are constructed to engage one another and lock the example cover 510 to the example side walls 505. In some examples, the example locking member 520 includes a latch connected to the example cover 510 via a hinge, such as a living hinge. In some examples, a user manually biases the example locking member 520 into engagement with the example locking member 530. In some examples, the example locking member 520 is positioned or constructed to automatically lock into engagement with the example locking member 530 when the example cover 510 is moved into a closed position. For instance, the example locking member 520 is inwardly biased, with an initial contact in the closing direction between the example locking member 520 and the example locking member 530 causing the example locking member 520 to be biased outwardly to permit relative motion between the example locking member 520 and the example locking member 530 as the example cover 510 is moved into the closed position. When the example cover 510 reaches the closed position, the example locking member 520 moves inwardly under bias (e.g., spring tension) to engage the example locking member 530. For instance, an example cutout of the example locking member 520 moves onto and into engagement with a projecting member of the example locking member 530.

FIGS. 5A-5B show that the example cover 510 includes an example handle 515 formed therein or attached thereto. In the example cover 510 of FIGS. 5A-5B, the example handle 515 is defined by an example first recess 516 and an example second recess 517 formed adjacent to, and spaced apart from, one another. In some examples, the example first recess 516 and the example second recess 517 extend at least substantially orthogonally from the example cover 510 so as to project inwardly into the example interior volume 599 when the example cover 510 is in the closed position, as is represented by way of example in FIG. 5A. In another example, the example handle 515 is defined by a single recess forming a ledge. In some examples, the example first recess 516 and/or the example second recess 517 include surface features, such as ribs or checkering, to facilitate digital manipulation and/or grip by a user. In yet another example, the example handle 515 is a rotatable handle housed within a recess formed in the example cover 510.

FIG. 6 is an example perspective view of the example base 200 of the example organizer 100 of FIGS. 1-4, with the example cover 300 removed for clarity to show the example interior volume 299 of the example organizer 100. Disposed in the example interior volume 299 is an example combination of the example first removable containers 500 of FIGS. 5A-5B and example second removable containers 600. The example second removable containers 600 are shown to possess example lateral dimensions greater than that of the corresponding dimension of the example first removable containers 500. For instance, a depth and a width of the example second removable containers 600 are greater than that of the corresponding dimensions of the example first removable containers 500, with a depth of the example second removable containers 600 being substantially equal to the width of the example first removable containers 500.

In a first portion of the example interior volume 299 of the example organizer 100 are disposed five of the example first removable containers 500 adjacent one another. In a second portion of the example interior volume 299 of the example organizer 100 are disposed two example second removable containers 600 with one of the example first removable containers 500 disposed therebetween. In a third portion and a fourth portion of the example interior volume 299 of the example organizer 100, adjacent the example handle 110, are disposed single ones of the example first removable containers 500. While FIG. 6 depicts one example organizer 100 having one arrangement of removable containers, the example organizer 100 can accommodate other arrangements of the example first removable containers 500 disposed and/or the example second removable containers 600 and/or other removable containers.

Figure 7A:
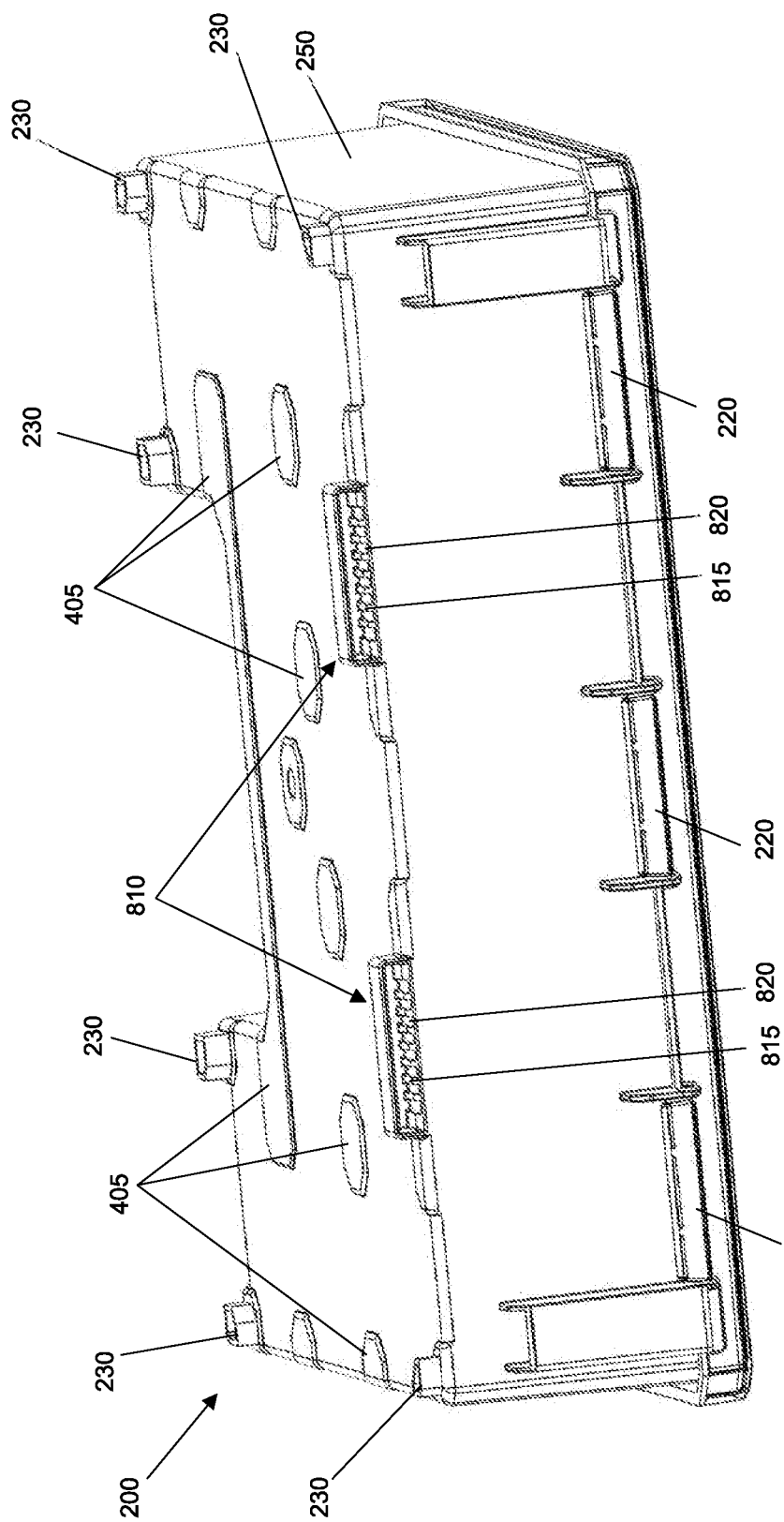
FIG. 7A is an example perspective view of an example bottom of an example base of the example organizer of FIGS. 1-4 and FIG. 6.

FIG. 7A is an example bottom perspective view of the example base 200 of the example organizer 100 of FIGS. 1-4. The example base 200 is shown to include six example legs 230 extending outwardly from the example rear portion of the example base 200. The example base 200 is shown to include a plurality of protrusions that correspond to the plurality of example recesses 405 formed in the example rear portion of the example base 200 to face the example interior volume 299 of the example organizer 100. The example base 200 is also shown to include the example second connectors 810 on the bottom portion of the example organizer 10. The example second connectors 810 serve to limit or prevent motion of the bottom portion of the example organizer 100 along one or more axes (translational and/or rotational) when the example second connectors 810 are engaged with and/or connected to the example first connectors 125 of the example wall mount 105. As noted above, the example second connectors 810 may include male-female connectors (e.g., spike and cone, pin and socket, boss and indentation, etc.), snap-fit connectors, frictional engagement surfaces, magnetic connectors or biasing elements (e.g., spring assisted pins, etc.). In the example of FIG. 7A, the example second connectors 810 include an example housing 840 (e.g., a female connector) defining an opening to receive the example first connectors 125. The example second connectors 810 include a plurality of example teeth 815 and example lands 820, which are illustrated in greater detail in FIG. 7B.

Figure 7B:
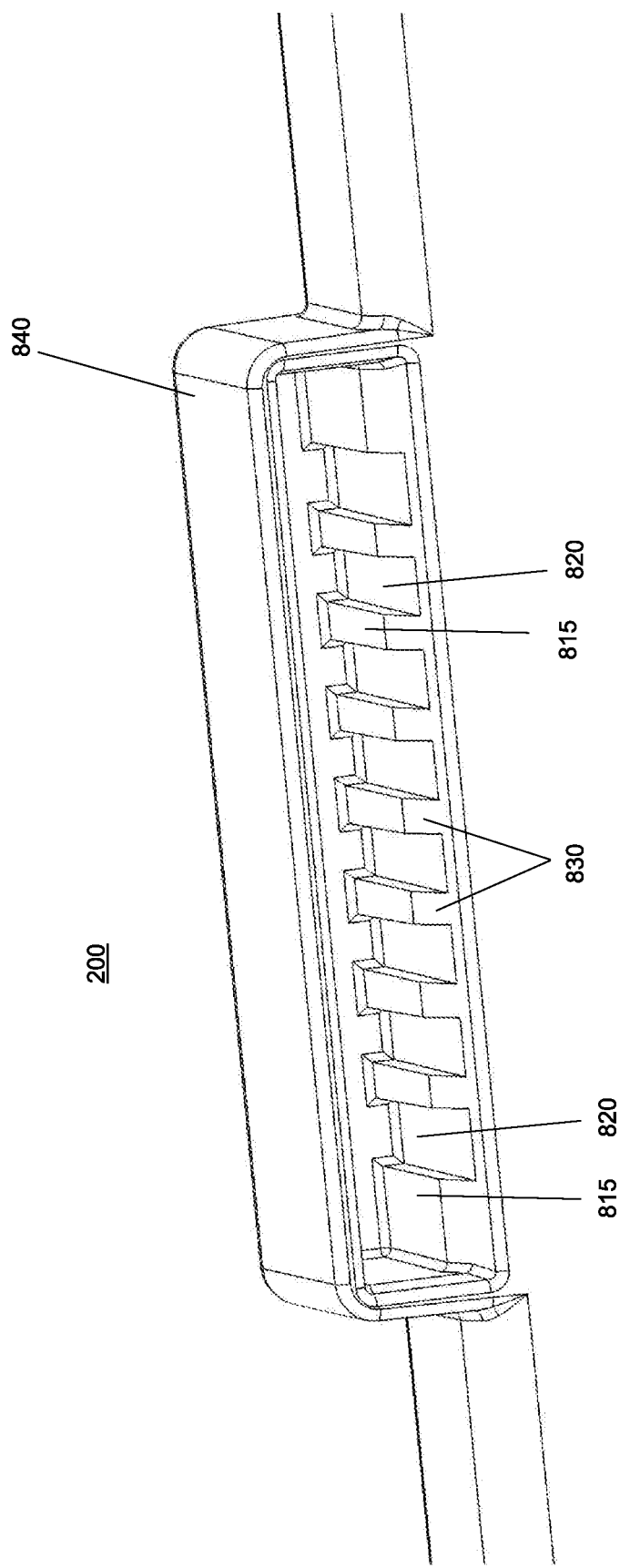
FIG. 7B is an example enlarged perspective view of an example bottom of the example base of the example organizer of FIGS. 1-4 and FIGS. 6-7A showing an example second wall mount connector.

FIG. 7B shows the example male connectors 815 to include example leading edges 830 that are angled or chamfered to facilitate localization and/or positioning of the features (e.g., the example teeth 815 and the example lands 820) of the example second connectors 810 with corresponding features (e.g., the example female connectors and the example male connectors) of the example wall mount 105. In other examples, the example leading edges 830 are rounded or polygonal. In some examples, the example teeth 815 are tapered, having a larger cross-sectional area at a top portion of the example teeth 815 than at a lower portion of the example teeth 815. In some examples, the example lands 820 include a polygonal configuration, such as a portion defined by a first angle and a second portion defined by a second angle. In some examples, the example housing 840 is constructed to bias the example first connectors 125 into engagement with the example second connectors 810.

The sizing and positioning of each of the example teeth 815 corresponds to similarly sized and positioned example lands in the example first connectors 125 of the example wall mount 105 and the sizing and positioning of each of the example lands 820 corresponds to similarly sized and positioned example teeth in the example first connectors 125 of the example wall mount 105. While one instance of example teeth 815 and the example lands 820 is shown, the example second connectors 810 may include other arrangements (e.g., size, position, spacing or pitch, form factor, etc.) of example teeth 815 and/or example lands 820.

In some examples, the example second connectors 810 are omitted, as are the example first connectors 125.

Figure 8A:
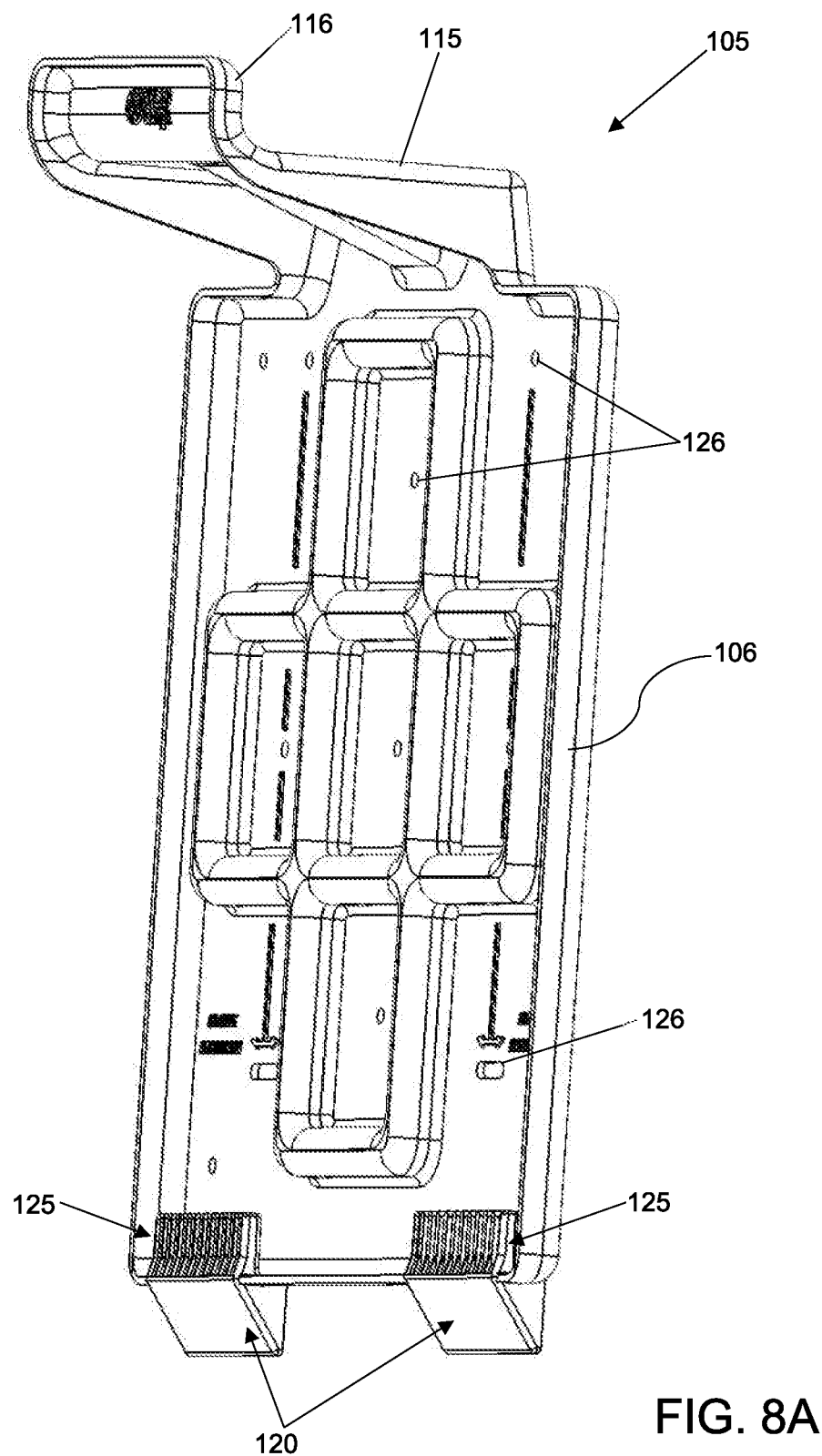
FIG. 8A is an example perspective view of the example wall mount of FIG. 1 and FIG. 3 to which the example organizer of FIGS. 1-4 and FIGS. 6-7B.

FIG. 8A shows the example wall mount 105 attachable to a wall or other vertical or inclined surface (hereinafter collectively denoted as a "wall" for brevity). In some examples, the example wall mount 105 is attached to a wall or other vertical or inclined surface via one or more example through holes 126 in the example base 106 through which mechanical fasteners (e.g., screws, nails, etc.) are disposed to connect the example wall mount 105 to the wall. In some examples, the example wall mount 105 is attached to a wall via one or more adhesives or is itself attached to another mount that is secured to the wall.

In some examples, the example base 106 of the example wall mount 105 includes an example second receiver (not shown), rather than example support 120, to receive an example second end (e.g., bottom end) of the example organizer 100. In some examples, the example second receiver bears at least a portion of a weight of an example organizer 100 inserted into the example wall mount 105. In some examples, the example first receiver 115 and the example second receiver each bear a portion of a weight of an organizer inserted into the example wall mount 105. In some examples, an example distal end of the example second receiver includes an example second retainer (e.g., a flange, a plate, a post, a dorsal protrusion, a high friction interface, a magnet, etc.) to inhibit or to prevent the example second end of the example organizer 100, or a bottom of another organizer, from moving in a forward direction away from the wall (see, e.g., example wall 107 in FIG. 1) and out of engagement with the example second receiver.

In some examples, the example wall mount 105 is an adjustable wall mount, with a first portion and a second portion, wherein the first portion is affixed relative to the example wall 107 and the second portion is movable (e.g., translatable and/or rotatable along one or more axes) relative to the first portion.

While FIGS. 1-3 show the example wall mount 105 of FIG. 8A used in combination with the example organizer 100, the wall mount 105 may be constructed to accommodate other organizers having different profiles or configurations (e.g., different lateral, vertical and/or depth).

Figure 8B:
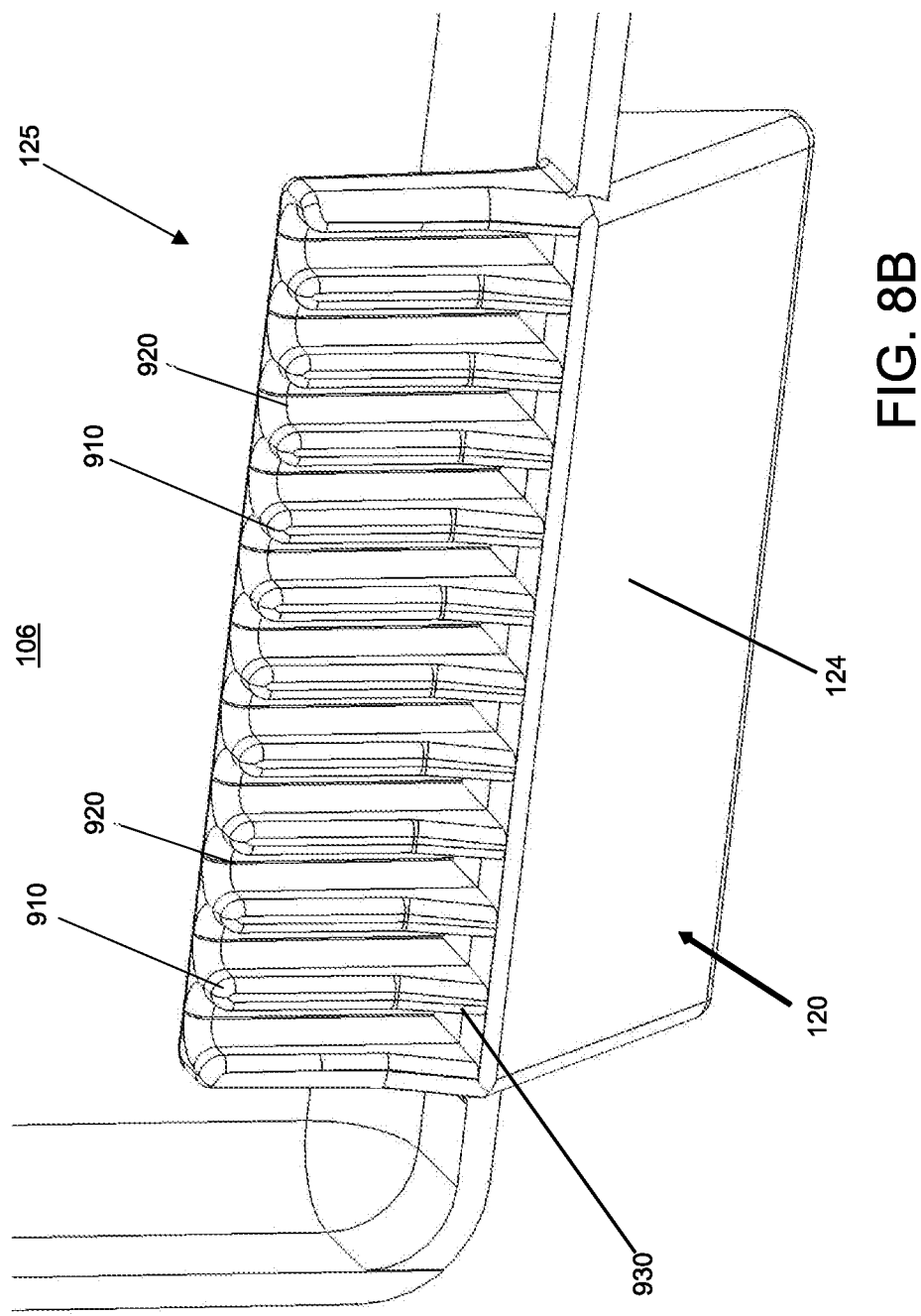

FIG. 8B is an example enlarged perspective view of an example lower support member 120 of the example wall mount 105 of FIGS. 1-3. The example lower support member 120 is adapted to engage a bottom portion of the example organizer 100 via the example first connectors 125, which are configured to matingly engage the example second connectors 810 on the bottom portion of the example base 200 of the example organizer 100, shown by way of example in FIG. 7B. In some examples, the example first connectors 125 include one of a male or a female connector and the example second connectors 810 include another one of the male or the female connector. In FIG. 8B, the example first connector 125 is a male connector projecting upwardly from the example angled support 124 that is constructed to matingly engage the female connector (e.g., the example second connectors 810) of the example base 200.

As shown in the example of FIG. 8B, the example first connector 125 includes a plurality of example teeth 910 and example lands 920. In some examples, the example teeth 910 include example leading edges (e.g., upper edges) that are angled, polygonal, chamfered or rounded to facilitate localization and/or positioning of the features (e.g., the example teeth 910 and the example lands 920) of the example first connector 125 with corresponding features (e.g., the example teeth 815 and the example lands 820) of the example second connector 810. In some examples, the example teeth 910 are tapered, having a larger cross-sectional area at a base portion of the example teeth 910 than at a top portion of the example teeth 910. For example, the example base portion of the example teeth 910 include an example angled section 930 to bias the example second connectors 810 into a desired position and engagement with the example first connector 125. While one instance of example teeth 910 and the example lands 920 is shown in FIG. 8B, the example first connectors 125 may include other arrangements (e.g., size, position, spacing or pitch, form factor, etc.) of example teeth 910 and/or example lands 920.

Figure 9:
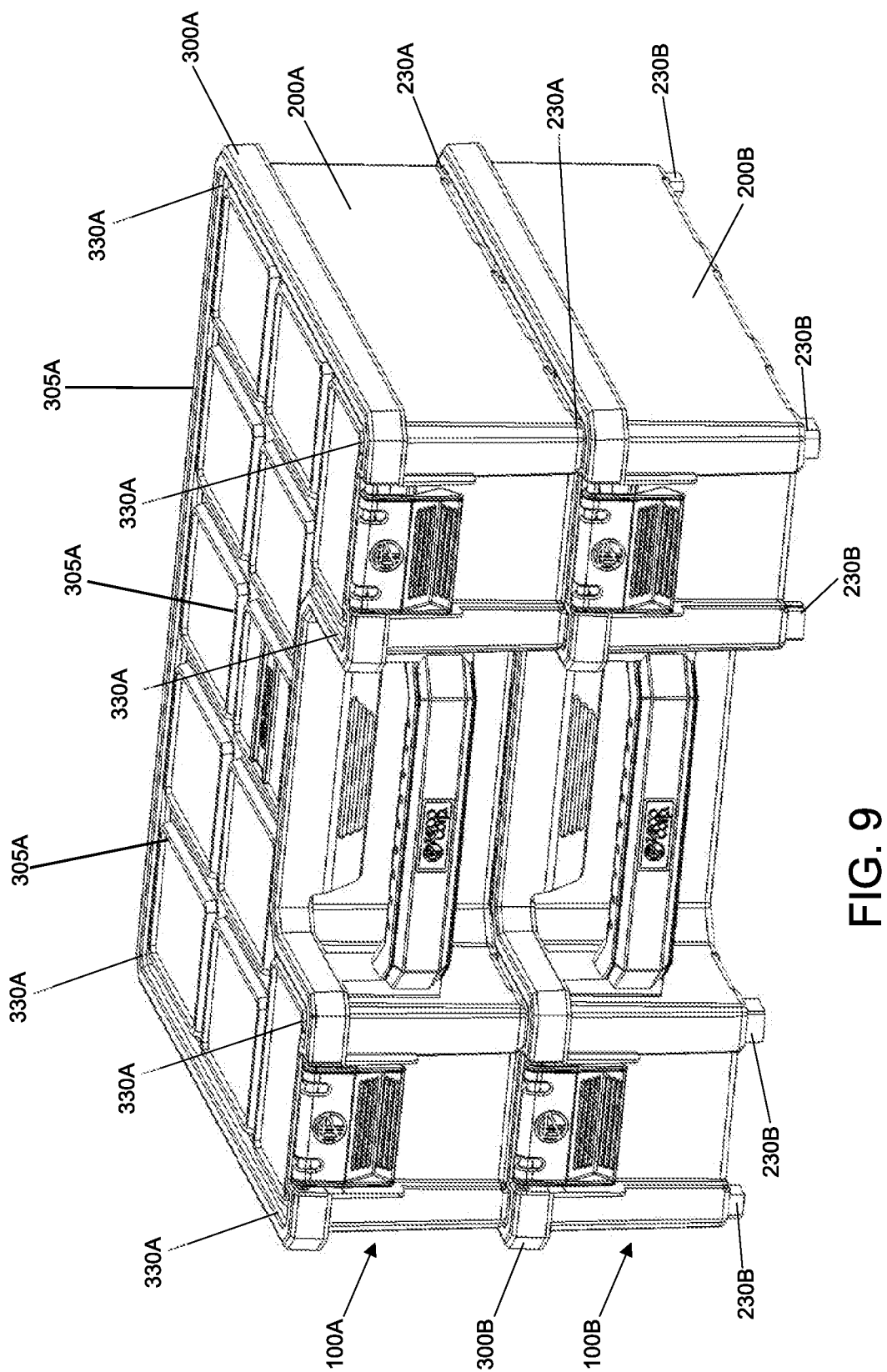
FIG. 9 is an example perspective view of an example first organizer stacked on an example second organizer, the example first organizer and the example second organizer corresponding to the example organizer of FIGS. 1-4 and FIG. 6.

FIG. 9 is an example perspective view of an example first organizer 100A stacked on an example second organizer 100B, the example first organizer 100A and the example second organizer 100B corresponding to the example organizer 100 of FIGS. 1-4 and FIGS. 6-7B. The example organizer 100A of FIG. 9 is shown to include an example base 200A and an example cover 300A matingly engaged to the example base 200A and the example organizer 100B of FIG. 9 is shown to include an example base 200B and an example cover 300B matingly engaged to the example base 200B. In the example of FIG. 9, the example base 200A is matingly engaged to the example cover 300A and the example base 200B is matingly engaged to the example cover 300B via one or more example hinges (not shown) along a side (e.g., a bottom side) of the respective example organizer 100A, 10B. Example bosses 305A are shown to define example lands 330A at a plurality of locations about the example cover 300A. The example lands 330A are dimensioned and configured to receive, and optionally retain example feet of another organizer to permit the stacking of a plurality of organizers on top of one another. For instance, the example feet 230A of the example organizer 100A are dimensioned and configured to be received within example lands 330B defined by example bosses 305B (not shown) of the of the example cover 300A of the example organizer 100B. The example bosses 305B (not shown) limit lateral movement of the example feet 230A of the example organizer 100A atop the example organizer 100B.

In the preceding examples, the example wall mount 105, the example lateral connectors 140, the example base 200, the example cover 300, the example first removable container 500, and/or the example second removable container 600, may be made from or include one or more metals (e.g., aluminum, an alloy, etc.) and/or one or more plastics (e.g., a polymer such as, but not limited to a thermoplastic polymer, a thermosetting polymer, a phenolic resin, polyamide (PA), polycarbonate (PC), high-density polyethylene (HDPE), low-density polyethylene (LDPE), polypropylene (PP), polyvinyl chloride (PVC), acrylonitrile butadiene styrene (ABS), etc.).

In the preceding examples, a plurality of locking mechanisms (i.e., the example central connector 315, the example lateral connectors 140 and the example side connectors 150) are shown to secure the example cover (e.g., cover 300) to the example base (e.g., base 200). In some examples, the example lateral connectors 140 are omitted. In some examples, the example lateral connectors 140 are replaced by, or optionally supplemented by, example side connectors disposed on other sides of the example organizer 100. In some examples, the example central connector 315 is omitted.

In some examples, the example wall mount 105 may include an example central connector (not shown) similar to that shown by way of the example central connector 315, but sized to engage a corresponding feature on the example base 200 of the example organizer 100. For example, the example central connector of the example wall mount 105 may includes a first mechanical closure (e.g., a snap connector, a ledge, a strike, a protrusion or boss, a recess, etc.) and the example base 200 includes a second mechanical closure (e.g., a snap connector, a ledge, a strike, a protrusion or boss, a recess, etc.) configured to matingly engage one another to lock the example base 200 of the example organizer 100 to the example wall mount 105. In some examples, the example central connector of the example wall mount 105 is disposed at a bottom portion of the example wall mount 105 to not only lock the example organizer 100 to the example wall mount, but to also support a bottom portion of the example organizer 100. In some examples, the example central connector of the example wall mount 105 is disposed at a top portion of the example wall mount 105.

In some examples, the example central connector of the example wall mount 105 is attached to, or integral with (e.g., formed as part of, permanently affixed to, etc.), the example wall mount 105. In some examples, the example central connector of the example wall mount 105 includes an example hinge connecting the example central connector to the example wall mount 105. In some examples, the example hinge of the example central connector of the example wall mount 105 is a living hinge. In some examples, the example central connector of the example wall mount 105 is a separate part from the example wall mount 105 and the example central connector includes a first hinge member (e.g., a shaft, etc.) that is attached to corresponding second hinge member (e.g., a knuckle, a loop, a joint, a node, etc.) of the example wall mount 105, with a spring or resilient element biasing the example central connector inwardly to facilitate the automatic engaging of the example mechanical closure of the example central connector with the corresponding mechanical closure on the example base 200 of the example organizer 100.

In some examples, the present concepts include a wall mounted organization system including an example wall mount 105 and including an example organizer (e.g., 100, etc.) having a base (e.g., 200, etc.) and a cover (e.g., 300, etc.), the organizer defining an interior volume (e.g., 299, etc.) in which is received one or more removable containers (e.g., 500, 600, etc.) dimensioned to occupy the interior volume, each of the one or more removable containers including a base including a rear portion and side walls together defining a second interior volume and a second opening to the second interior volume and further including a cover dimensioned to engage the side walls of the base to occlude the second opening to the second interior volume with the second cover in a closed position.

The wall mounted organization system enables the storage of an example organizer on a wall or other inclined surface (e.g., a surface in a work van, etc.).

Although certain example apparatus, articles of manufacture and methods have been disclosed herein, the scope of coverage of this patent is not limited thereto. On the contrary, this patent covers all methods, apparatus and articles of manufacture fairly falling within the scope of the claims of this patent.

Figure 10A:
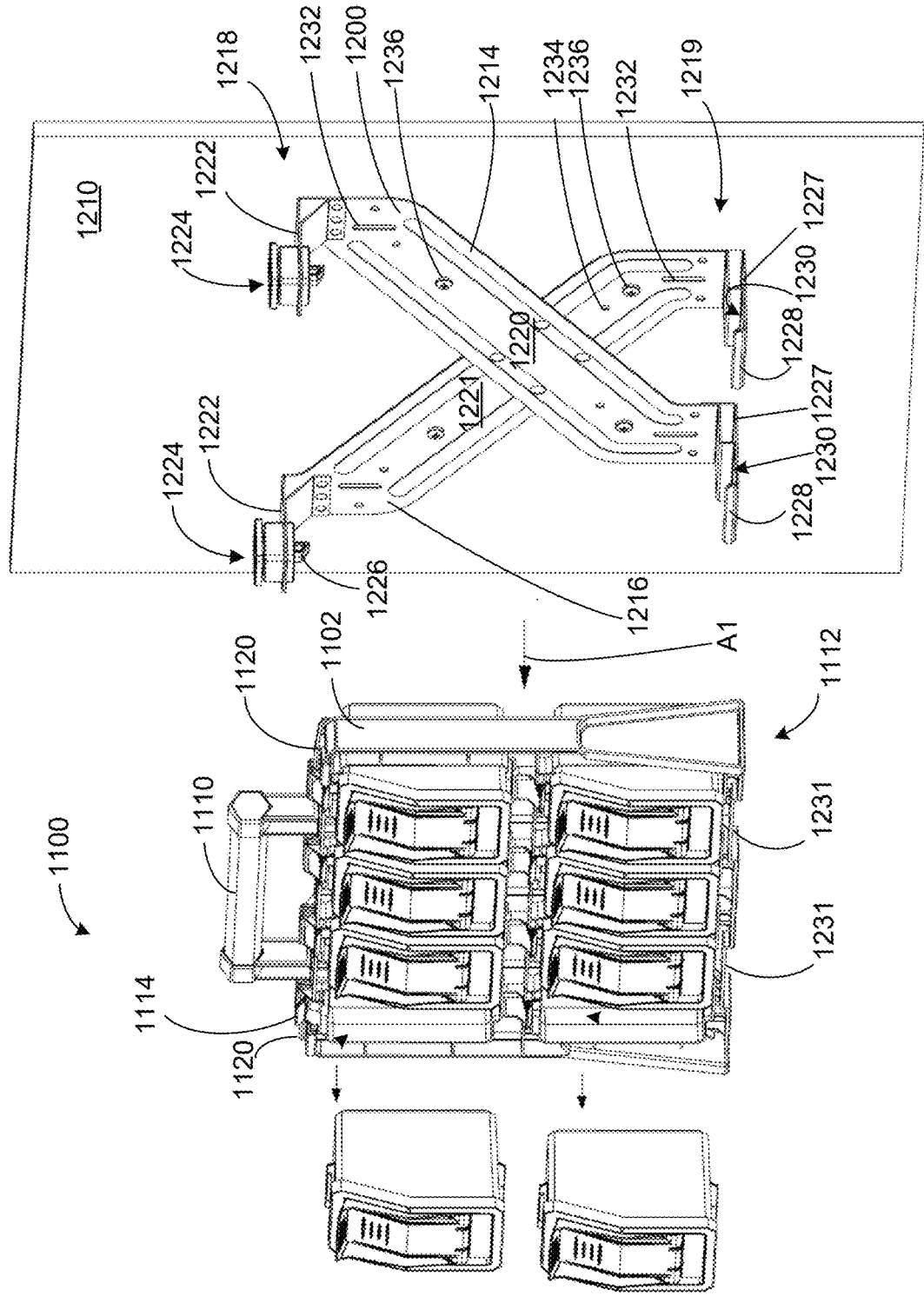
FIG. 10A is an exploded perspective illustration of an organizer and an example wall mount bracket in accordance with teachings of this disclosure.

FIG. 10A is an exploded perspective illustration of an example organizer 1100, showing the organizer 1100 in relation to an example wall mount bracket 1200 attached to an example wall 1210, with the example arrow A1 indicating an example removal of the organizer 1100 from the wall mount bracket 1200.

The wall mount bracket 1200 of FIG. 10A includes an example first section 1214 attached to, or integrally formed with, an example second section 1216. In some examples, wall mount bracket 1200, the first section 1214 of the wall mount bracket 1200 and/or the second section 1216 of the wall mount bracket 1200 are formed from a plastic (e.g., PET, HDPE, PVC, LDPE, PP, PS, POM, etc.) and/or a metal or a metal alloy (e.g., aluminum, steel, etc.). In the example form factor depicted, the first section 1214 and the second section 1216 form a generally X-shaped wall mount bracket 1200. In other examples, the wall mount bracket 1200 includes a rectangular frame dimensioned to receive the frame 1102 of the organizer 1100. In some examples, the wall mount bracket 1200 includes an upper section and a lower section that are separate from one another (e.g., a substantially parallel upper bracket and lower bracket each separately mounted to the wall 1210, etc.).

The wall mount bracket 1200 includes an example upper portion 1218 and an example lower portion 1219. In some examples, the first section 1214 includes an example base 1220 constructed to attach to the wall 1210 and/or to the second section 1216 and the second section 1216 includes an example base 1221 constructed to attach to the wall 1210 and/or to the first section 1214. The upper portion 1218 of the wall mount bracket 1200 includes an example first pair of arms (e.g., receivers, supports, etc.) 1222 extending outwardly from the base 1220 and the base 1221. In some examples, the first pair of arms 1222 extends outwardly, from proximal ends at the base 1220 and the base 1221, substantially perpendicular to the base 1220 and the base 1221 (plus or minus 1 degree, plus or minus 2 degrees, plus or minus 3 degrees, etc.). At distal ends of the first pair of arms 1222 are connectors, shown in FIG. 10A by quick release connectors 1224 having movable pins 1226 to engage the adapter 1120 and/or the opening 125 of the adapter 1120 and releasably secure the frame 1102 via engagement of the connectors (e.g., movable pins 1226 engaging the opening 1125 of the adapter 1120, etc.). For example, the movable pins 1226 are constructed to fit within the opening 1125 of the adapter 1120. In some examples, the movable pins 1226 are spring-loaded with springs biasing the movable pins 1226 in a downward direction to facilitate connection of the movable pins 1226 to the adapter 1120 and/or the opening 1125 of the adapter 1120.

The lower portion 1219 of the wall mount bracket 1200 includes an example second pair of arms (e.g., receivers, supports, etc.) 1227 extending outwardly from the base 1220 and the base 1221. In some examples, the second pair of arms 1227 extends outwardly from the base 1220 and the base 1221 substantially perpendicular to the base (plus or minus 1 degree, plus or minus 2 degrees, plus or minus 3 degrees, etc.). In some examples, the second pair of arms 1227 extends outwardly, from proximal ends at the base 1220 and the base 1221, substantially perpendicular to the base 1220 and the base 1221 (plus or minus 1 degree, plus or minus 2 degrees, plus or minus 3 degrees, etc.). At distal ends of the second pair of arms 1227 are provided example lateral retainers 1228 and example supports 1230 dimensioned to engage corresponding example features 1231 (e.g., a recessed portion, etc.) at the lower portion 1112 of the frame 1102. In the example shown in FIG. 10A, the supports 1230 take the form of substantially flat sections of the second pair of arms 1227 that are received within the features 1231, with the lateral retainers 1228 extending beyond the features 1231 to engage a front portion of the frame 1102. In some examples, the lateral retainers 1228 curve upwardly to engage a front portion of the frame 1102 and prevent movement of the lower portion 112 of the organizer 1100 away from the base 1220 and the base 1221 of the wall mount bracket 1200. Likewise, the movable pins 1226 engage the adapters 1120 and/or the openings 1125 of the adapters 1120 at the upper portion 1108 of the frame 1102 to prevent movement of the upper portion 1108 of the organizer 1100 away from the base 1220 and the base 1221 of the wall mount bracket 1200 during such engagement.

In some examples, the movable pins 1226 are constructed to fit within the openings 1125 of the adapters 1120. In some examples, the quick release connectors 1224 are spring-loaded to bias the movable pins 1226 (e.g., in a downward direction, etc.) to facilitate automatic connection of the movable pins 1226 to the adapter 1120 and/or the opening 1125 of the adapter 1120 once the example organizer 1100 is properly positioned within the wall mount bracket 1200 to thereby releasably secure the frame 1102 to the wall mount bracket 1200 via engagement of the connectors (e.g., movable pins 1226 engaging the opening 1125 of the adapter 1120, etc.).

In some examples, to facilitate positioning of the wall mount bracket 1200 on the wall 1210 and/or to ease installation, the first section 1214 and/or the second section 1216 include one or more through example slots 1232, in one or more portions of the first section 1214 and/or the second section 1216, through which an example fastener (not shown) may be disposed to secure to the wall 1210. The slots 1232, which are shown as example vertical slots, facilitate alignment of fasteners at different points along an axis of the slots 1232. In some examples, to facilitate mounting of the wall mount bracket 1200 to the wall 1210, the first section 1214 and/or the second section 1216 include one or more example through holes 1234, in one or more portions of the first section 1214 and/or the second section 1216, through which an example fastener 1236 may be disposed to secure to the wall 1210.

To illustrate attachment of the first organizer 1100 to the wall mount bracket 1200, the lower portion 1112 of the frame 1102 of the organizer 1100 is positioned so that the features 1231 are aligned with the second pair of arms 1227 so that the features 1231 engage (e.g., rest upon, etc.) the supports 1230. With the lower portion 1112 of the frame 1102 positioned in the supports 1230, the upper portion 1108 of the frame 1102 is pivoted toward the wall mount bracket 1200, whereupon the adapters 1120 engage the pins 1226 to bias the pins 1226 upwardly into the quick release connectors 1224 until the openings 1125 are positioned below the pins 1226, at which point the pins 1226 will be biased (e.g., by spring force or force of another resilient member, etc.) into the openings 1125, thereby locking the upper portion 1108 of the frame 1102 into the wall mount bracket 1200. To reverse the process and remove the organizer 1100 from the wall mount bracket 1200, an upper portion of the quick release connectors 1224 are moved upwardly to correspondingly move the pins 1226 upwardly until the pins 1226 clear the openings 1125, enabling movement of the upper portion 1108 of the frame 1102 away from the wall mount bracket 1200. The organizer 1100 may then be lifted away from the wall mount bracket 1200 to disengage the features 1231 at the lower portion 1112 of the frame 1102 from the second pair of arms 1227.

Figure 10B:
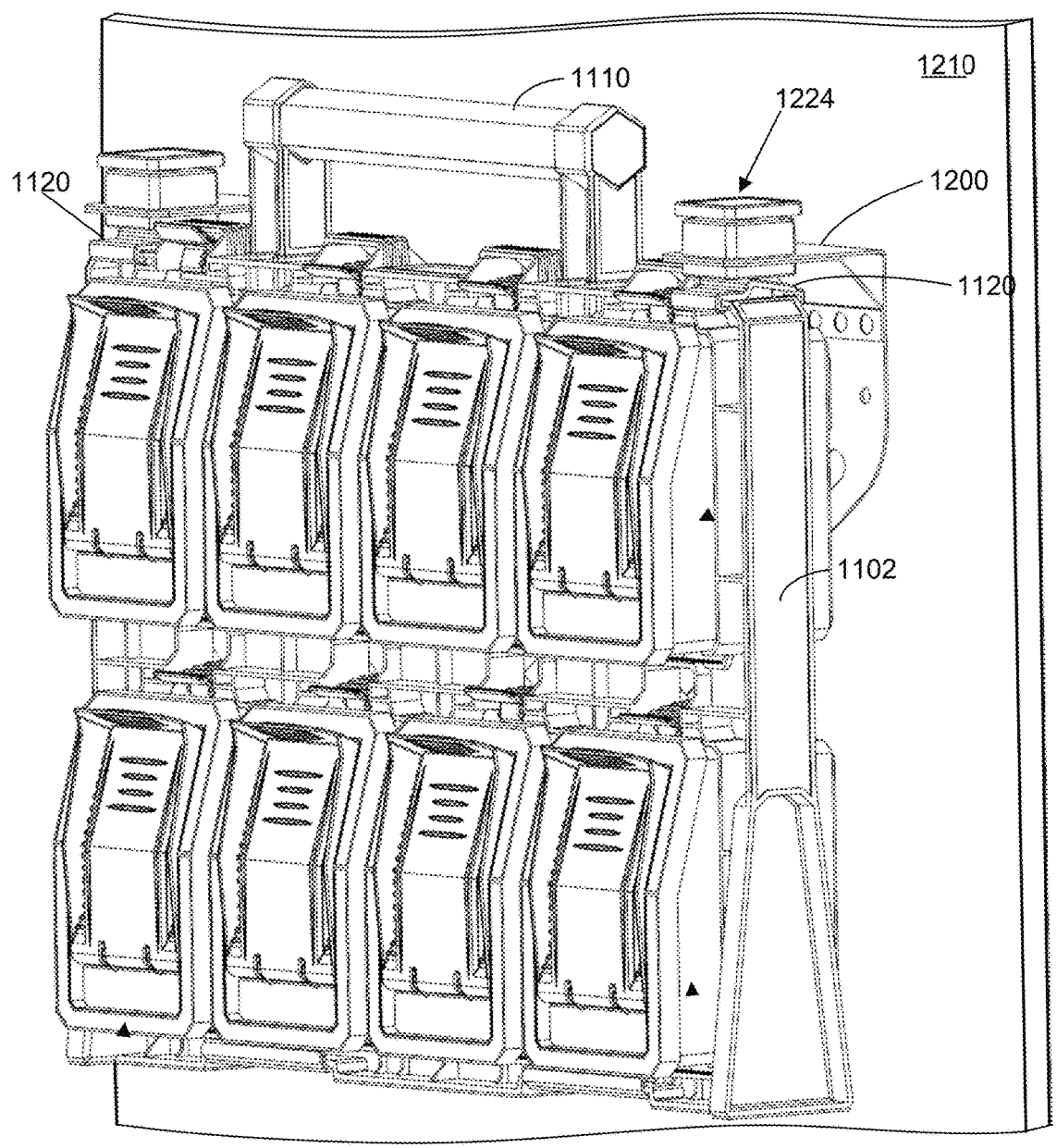
FIG. 10B is a perspective illustration of an organizer removably attached to the wall mount bracket of FIG. 10A in accordance with teachings of this disclosure.

FIG. 10B is a perspective illustration of the organizer 1100 removably attached to the wall mount bracket 1200 of FIG. 10A. As shown in FIG. 10B, the frame 1102 is positioned so that the features 1231 are aligned with the second pair of arms 1227 and engage the supports 1230 with the lateral retainers 1228 extending beyond the features 1231 to engage a front portion of the frame 1102. The adapters 1120 are engaged by the pins 1226 of the quick release connectors 1224, which locks the upper portion of the frame 1102 into the wall mount bracket 1200. In some examples, FIG. 10B represent a portion of a wall 1210 of a work van and the organizer 1100 is positioned on the wall mount bracket 1200 for transport. In some examples, FIG. 10B represents a portion of a wall 1210 of a home, garage or workshop.

Thus, in some examples, the wall mount comprises a first arm (e.g., receiver, support, etc.) extending outwardly from an upper portion of a first side of the base by a first distance and a second arm (e.g., receiver, support, etc.) extending outwardly from an upper portion of a second side of the base by the first distance, each of the first receiver and the second receiver comprising a retainer or connector to inhibit or prevent movement of an upper portion of a tool box disposed on the wall mount away from the base.

What is claimed is:

1. A wall mount for a tool box, the wall mount comprising:
    a base, the base being at least substantially planar and defining a surface area dimensioned to receive a tool box;
    at least one support extending outwardly from a lower portion of the base by a first distance, the at least one support constructed to bear a first portion of a weight of a tool box received by the wall mount; and
    a receiver extending outwardly from an upper portion of the base by a second distance, the receiver being constructed to receive a handle of a tool box, to bear a second portion of a weight of a tool box received by the wall mount, and to prevent outward rotation of a tool box about the at least one support,
    wherein a height of the base is greater than the first distance or the second distance,
    wherein the second distance is greater than the first distance, and
    wherein the weight of the tool box received by the wall mount consists of the sum of the first portion and the second portion of the weight of toolbox, wherein the receiver comprises a retainer at a distal portion thereof wherein the retainer of the receiver comprises one or more upwardly extending sections or members to limit forward movement of a handle of a tool box received by the wall mount.

2. The wall mount according to claim 1, wherein the retainer of the receiver comprises a recessed area to receive a handle of a tool box received by the wall mount and to limit translation of the handle along the retainer, the recessed area positioned to dispose a base of a tool box adjacent the base of the wall mount.

3. The wall mount according to claim 1, wherein the at least one support comprises a retainer at a distal portion thereof.

4. The wall mount according to claim 3, wherein the retainer of the at least one support comprises one or more upwardly extending sections or members to limit lateral movement of a base portion of a tool box received by the wall mount.

5. The wall mount according to claim 1, wherein the at least one support comprises one or more first connectors comprising one or more male features and/or one or more female features to matingly engage corresponding one or more second connectors of a tool box received by the wall mount.

6. The wall mount according to claim 5, wherein the one or more first connectors comprise recessed areas, grooves or teeth.

7. The wall mount according to claim 1, wherein the at least one support comprises two spaced-apart supports with a first support at a first lateral side of the base and a second support at a second lateral side of the base.

8. The wall mount according to claim 7, wherein the at least one support comprises a third support disposed between the first support and the second support.

9. The wall mount according to claim 1, wherein the at least one support comprises a single support extending along substantially an entire width of the base of the wall mount.

10. The wall mount according to claim 1, wherein the at least one support comprises a single support extending along only a portion of a width of the base of the wall mount.

11. The wall mount according to claim 1, wherein the wall mount is a unitary structure formed from a polymer.

\* \* \* \* \*